United States Patent
Wang et al.

(10) Patent No.: US 9,217,370 B2
(45) Date of Patent: Dec. 22, 2015

(54) FLUID FLOW DEVICES WITH VERTICALLY SIMPLE GEOMETRY AND METHODS OF MAKING THE SAME

(75) Inventors: Ivan Wang, Durham, NC (US); Jason Ethier, Boston, MA (US); Hardy Shen, Sunnyvale, CA (US)

(73) Assignee: Dynamo Micropower Corporation, Somerville, MA (US)

(*) Notice: Subject to any disclaimer, the term of this patent is extended or adjusted under 35 U.S.C. 154(b) by 709 days.

(21) Appl. No.: 13/399,047

(22) Filed: Feb. 17, 2012

(65) Prior Publication Data

US 2012/0210728 A1 Aug. 23, 2012

Related U.S. Application Data

(60) Provisional application No. 61/444,138, filed on Feb. 18, 2011.

(51) Int. Cl.
*F02C 3/04* (2006.01)
*F02C 7/08* (2006.01)
(Continued)

(52) U.S. Cl.
CPC . *F02C 7/08* (2013.01); *F01D 15/10* (2013.01); *F02C 3/05* (2013.01); *F02C 7/32* (2013.01);
(Continued)

(58) Field of Classification Search
CPC ............... F02C 3/05; F02C 3/10; F02C 6/18; F02C 7/08; F02C 7/26; F02C 7/264; F05D 2250/82; F05D 2260/85
USPC ........ 60/778, 786, 788, 804, 805, 722, 39.15, 60/39.43; 415/45, 77, 83
See application file for complete search history.

(56) References Cited

U.S. PATENT DOCUMENTS 3,896,875 A * 7/1975 Bolger ............................ 165/86
3,937,013 A * 2/1976 Aspinwall .................... 60/226.3
(Continued)

FOREIGN PATENT DOCUMENTS

WO    WO 02/18793 A1    3/2002
WO    WO 2004/013557 A1    2/2004

OTHER PUBLICATIONS

[No Author Listed], Multi-Wafer Rotating MEMS Machines: Turbines, Generators, and Engines from MEMS Reference Shelf. Ed.: J. H. Lang. Springer Science+Business Media, LLC. 2009. 14 Pages doi:10.1007/978-0-387-77747-4.
(Continued)

*Primary Examiner* — Steven Sutherland
(74) *Attorney, Agent, or Firm* — Wolf, Greenfield & Sacks, P.C.

(57) ABSTRACT

A micro-turbine engine, consisting of at least a compressor, combustor, and turbine, is a complicated fluid flow device that controls the flow rate and thermodynamic properties of a working fluid in order to generate shaft power. Existing micro-turbines are costly to manufacture because they are designed with sophisticated contours and exotic materials. The present invention discloses a method for designing a micro-turbine with stacked layers of structure, each of which is designed with vertically simple geometry such that it can be manufactured using conventional machining technology. The resulting micro-turbine is low cost compared to existing alternatives in the target range of power outputs and applications. The present invention also describes a method for connecting the micro-turbine to an electrical generator to generate power. Lastly, the method for designing the micro-turbine is applied to heat exchangers, Rankine engines, fluid mixers, and other fluid flow devices.

15 Claims, 13 Drawing Sheets

(51) Int. Cl.
  *F01D 15/10* (2006.01)
  *F02C 3/05* (2006.01)
  *F02C 7/32* (2006.01)

(52) U.S. Cl.
  CPC ......... *F05D 2230/10* (2013.01); *F05D 2250/82* (2013.01); *Y02E 20/16* (2013.01); *Y10T 137/6416* (2015.04); *Y10T 137/8593* (2015.04); *Y10T 137/85978* (2015.04)

(56) References Cited

U.S. PATENT DOCUMENTS

| | | | |
|---|---|---|---|
| 4,560,319 A | | 12/1985 | Blotenberg |
| 4,664,599 A | | 5/1987 | Robbins et al. |
| 4,747,262 A | * | 5/1988 | Maynard ............... 60/39.23 |
| 4,770,605 A | | 9/1988 | Nakatomi |
| 4,845,941 A | * | 7/1989 | Paul ............... 60/776 |
| 5,059,091 A | | 10/1991 | Hatfield |
| 5,193,989 A | | 3/1993 | Fleury et al. |
| 5,220,784 A | | 6/1993 | Wilcox |
| 5,231,822 A | * | 8/1993 | Shekleton ............... 60/786 |
| 5,481,866 A | * | 1/1996 | Mowill ............... 60/39.23 |
| 5,488,827 A | | 2/1996 | Helmich et al. |
| 5,531,633 A | * | 7/1996 | Riley et al. ............... 451/28 |
| 5,533,608 A | | 7/1996 | Adams et al. |
| 5,584,174 A | | 12/1996 | Bates et al. |
| 5,628,182 A | * | 5/1997 | Mowill ............... 60/804 |
| 5,692,378 A | | 12/1997 | Ramsden |
| 5,737,913 A | | 4/1998 | Terry |
| 5,932,940 A | | 8/1999 | Epstein et al. |
| 6,000,916 A | | 12/1999 | Martin et al. |
| 6,019,927 A | * | 2/2000 | Galliger ............... 264/221 |
| 6,169,390 B1 | | 1/2001 | Jungreis |
| 6,212,917 B1 | | 4/2001 | Rathbun |
| 6,392,313 B1 | | 5/2002 | Epstein et al. |
| 6,471,493 B2 | | 10/2002 | Choi et al. |
| 6,536,098 B1 | | 3/2003 | Luo et al. |
| 6,539,720 B2 | * | 4/2003 | Rouse et al. ............... 60/651 |
| 6,573,624 B2 | | 6/2003 | Park |
| 6,639,328 B2 | | 10/2003 | Wacknov |
| 6,651,633 B1 | | 11/2003 | Jones |
| 6,748,742 B2 | | 6/2004 | Rouse et al. |
| 6,863,509 B2 | * | 3/2005 | Dewis ............... 417/407 |
| 6,924,563 B2 | | 8/2005 | Garces et al. |
| 6,955,528 B2 | | 10/2005 | Mukherjee et al. |
| 7,010,906 B2 | | 3/2006 | Cazenave et al. |
| 7,040,278 B2 | | 5/2006 | Badgley |
| 7,086,833 B2 | | 8/2006 | Cvjeticanin et al. |
| 7,117,892 B2 | | 10/2006 | Krywitsky |
| 7,134,836 B2 | | 11/2006 | Scherrer |
| 7,156,618 B2 | | 1/2007 | Fish et al. |
| 7,192,062 B2 | | 3/2007 | Densel et al. |
| 7,211,906 B2 | * | 5/2007 | Teets et al. ............... 290/52 |
| 7,215,098 B2 | * | 5/2007 | Harris et al. ............... 322/24 |
| 7,273,348 B2 | | 9/2007 | Amirtharajah et al. |
| 7,402,927 B2 | | 7/2008 | Belpanno et al. |
| 7,452,182 B2 | | 11/2008 | Vance et al. |
| 7,487,641 B2 | | 2/2009 | Frechette et al. |
| 7,506,828 B2 | | 3/2009 | Ayers et al. |
| 7,517,187 B2 | | 4/2009 | Hsu et al. |
| 7,694,505 B2 | | 4/2010 | Schilling |
| 7,909,578 B2 | | 3/2011 | Nishiyama et al. |
| 7,934,368 B2 | | 5/2011 | Muller et al. |
| 7,937,947 B2 | | 5/2011 | Kishibe et al. |
| 7,955,046 B2 | | 6/2011 | McCune et al. |
| 7,976,274 B2 | | 7/2011 | Lee et al. |
| 7,997,085 B2 | | 8/2011 | Moniz et al. |
| 8,016,565 B2 | | 9/2011 | Berg et al. |
| 8,181,462 B2 | | 5/2012 | Arnold et al. |
| 8,220,262 B2 | | 7/2012 | Robinson |
| 8,297,944 B2 | | 10/2012 | Chou |
| 8,350,399 B2 | | 1/2013 | Post |
| 8,353,158 B2 | | 1/2013 | Purdey et al. |
| 8,366,385 B2 | | 2/2013 | Davis et al. |
| 8,387,243 B2 | | 3/2013 | An et al. |
| 8,418,457 B2 | | 4/2013 | Schmidt |
| 8,464,539 B2 | | 6/2013 | Pelletier et al. |
| 8,485,775 B2 | | 7/2013 | Pickard |
| 2002/0149205 A1 | * | 10/2002 | Gilbreth et al. ............... 290/1 R |
| 2005/0121909 A1 | | 6/2005 | Densel et al. |
| 2005/0126175 A1 | | 6/2005 | Badgley |
| 2007/0165973 A1 | | 7/2007 | Belpanno et al. |
| 2008/0022653 A1 | | 1/2008 | Schilling |
| 2008/0048456 A1 | | 2/2008 | Browning et al. |
| 2008/0159857 A1 | | 7/2008 | Jonsson |
| 2010/0133832 A1 | | 6/2010 | Butt |
| 2010/0176592 A1 | | 7/2010 | Artes de Arcos Marco |
| 2010/0251692 A1 | | 10/2010 | Kinde, Sr. |
| 2010/0272508 A1 | | 10/2010 | Vichinsky |
| 2010/0295308 A1 | | 11/2010 | Post |
| 2011/0038706 A1 | | 2/2011 | Lefebvre et al. |
| 2012/0167591 A1 | | 7/2012 | Drachsler et al. |
| 2012/0171037 A1 | | 7/2012 | R et al. |
| 2012/0180488 A1 | | 7/2012 | Bailey et al. |
| 2012/0319408 A1 | | 12/2012 | Plotsker |
| 2012/0324898 A1 | | 12/2012 | McMahan et al. |
| 2013/0071243 A1 | | 3/2013 | Kocher et al. |
| 2013/0104551 A1 | | 5/2013 | Uhm et al. |
| 2013/0104552 A1 | | 5/2013 | Uhm et al. |
| 2013/0156552 A1 | | 6/2013 | Barlog |
| 2013/0269348 A1 | | 10/2013 | Ethier et al. |
| 2014/0130500 A9 | | 5/2014 | Ethier et al. |

OTHER PUBLICATIONS

[No Author Listed], Technology Characterization: Microturbines. Prepared for: Environmental Protection Agency, Washington, DC, USA. Mar. 2002; 27 Pages.

Frechette et al., High-speed microfabricated silicon turbomachinery and fluid film bearings. IEEE, Feb. 2005;14(1):141-52. doi:10.1109/JMEMS.2004.839008.

Isomura et al., Development of Micromachine Gas Turbine for Portable Power Generation. The Japan Society of Mechanical Engineers. Series B, 2004;47(3): 459-464.

Matsuo et al., Towards the Development of Finger-Top Gas Turbines. Proc. International Gas Turbine Congress. Tokyo, Japan. Nov. 2-7, 2003.

McDonald et al., Small Recuperated Ceramic Microturbine Demonstrator Concept. Applied Thermal Engineering. Jan. 2008;28(1): 60-74.

Pehnt et al., Environmental impacts of distributed energy systems—The case of micro cogeneration. In: Environmental Science and Policy. Elsevier, Feb. 2008;11:25-37.

Peirs et al., A microturbine for electric power generation. Sensors and Actuators A. Feb. 2004;113:86-93.

Vick et al., Engine Design Strategies to Maximize Ceramic Turbine Life and Reliability. J. Eng. Gas Turbines Power. Jun. 2011; 134(8):081301. 11 Pages. doi:10.1115/1.4005817.

* cited by examiner

Rotor Side  Exhaust Side

Engine Internal Side  Engine External Side

| Parameter | Lower Bound | Nominal Value | Upper Bound |
|---|---|---|---|
| Rotor diameter | 5 cm | 10 cm | 20 cm |
| Rotor RPM | 20000 RPM | 60000 RPM | 100000 RPM |
| Power output | 0.5 kW | 5 kW | 20 kW |
| Air mass flow | 10 g/s | 100 g/s | 500 g/s |
| Thermal efficiency | | | |
|   Standard cycle | 5% | 8% | 10% |
|   Recuperated | 10% | 15% | 20% |
| Fuel mass flow | | | |
|   Standard cycle | 0.3 g/s | 2.8 g/s | 10.0 g/s |
|   Recuperated | 0.2 g/s | 1.4 g/s | 5.0 g/s |

FLUID FLOW DEVICES WITH VERTICALLY SIMPLE GEOMETRY AND METHODS OF MAKING THE SAME

CROSS REFERENCE TO RELATED APPLICATION

This application claims priority to U.S. Provisional Patent Application No. 61/444,138 filed Feb. 18, 2011, titled "Applications and manufacture of a novel architecture combined cycle micro-turbine" the disclosure of which is incorporated by reference herein in its entirety.

STATEMENT REGARDING FEDERALLY SPONSORED RESEARCH OR DEVELOPMENT

The U.S. government may have certain rights in the present invention pursuant to grant from the National Science Foundation SBIR Phase I grant, contract No. 1143081.

FIELD OF THE INVENTION

The present invention relates to the field of fluid flow devices, including but not limited to turbomachinery, heat exchangers, and valves. Specifically, the present invention relates to architecture and manufacturing of small scale fluid flow devices.

BACKGROUND OF THE INVENTION

This specification refers to certain patent references and technical references throughout the description, the disclosures of which are incorporated herein by reference in their entireties.

Due to increasing demands for distributed generation, there has been an increasing amount of research dedicated to building small-scale power generators with high power density. The primary focus of recent research has been on micro-turbines because of their intrinsically high power density, low maintenance, longer lifetime, fuel flexibility, potentially higher efficiency, and more compact form factor.

A significant portion of recent research is focused on improving the overall efficiency of centimeter-scale micro-turbines in converting fuel to useable electric power. See McDonald et al., "Small Recuperated Ceramic Microturbine Demonstrator Concept," *Applied Thermal Engineering* 28 (2008), pp. 60-74. Most of these efforts have led to solutions such as ceramic turbine components, high efficiency regenerative heating components, air-powered bearings, and highly complicated component geometries. See Vick et al., "Engine Design Strategies to Maximize Ceramic Turbine Life and Reliability," *Proc. ASME Turbo Expo.* GT2011-46784, Vancouver, British Columbia (June 2011). These solutions lead to high costs that make it too expensive for mass adoption of micro-turbine technology as a means of implementing distributed generation.

Another branch of micro-turbine research is focused on the design and manufacturing of millimeter-scale micro-turbines that are constructed out of either metal or silicon. The metal engines are manufactured using micro-machining techniques. See, e.g., Isomura et al., "Development of Micromachine Gas Turbine for Portable Power Generation" *The Japan Society of Mechanical Engineers International Journal*, Series B, Vol. 47, No. 3 (2011), and Matsuo et al., "Towards the Development of Finger-Top Gas Turbines" *Proc. International Gas Turbine Congress*, Tokyo, Japan, (November, 2003). The silicon engines are manufactured using semiconductor and micro-electro-mechanical system (MEMS) technologies. (See, e.g., Frechette et al., "High-Speed Microfabricated Silicon Turbomachinery and Fluid Film Bearings" *Journal of Microelectromechanical Systems*, Vol. 14, No. 1 (February, 2005); U.S. Pat. No. 7,487,641 to Frechette et al., "Microfabricated Rankine Cycle Steam Turbine for Power Generation and Methods of Making the Same"; U.S. Pat. No. 6,392,313 to Epstein et al., "Microturbomachinery"; and U.S. Pat. No. 7,934,368 to Muller et al., "Ultra-Micro Gas Turbine") Reducing the characteristic length of the engine in this way theoretically increases the power density, but prohibitively expensive manufacturing technologies such as the ones described above are required. See Peirs et al., "A Microturbine for Electric Power Generation" *Sensors and Actuators A* 113 (2004) pp. 86-93.

Accordingly, there is still a need for a low cost power generator that retains all of the other advantages of a micro-turbine. When considering affordability as another design goal, then it becomes difficult to achieve high efficiencies at the same time using conventional designs. The challenge is, therefore, to find a compromise between cost and efficiency while maintaining low maintenance and a compact form factor. As a consequence of low maintenance requirements, the carbon footprint of a long lived micro-turbine could be 30% less than conventional reciprocating systems due to the reduced demand for lubricating oil—while maintaining comparable efficiencies. This has led to a new concept for designing micro-turbine engines. Furthermore, the new concept can also be applied to designing small-scale fluid control and manipulation devices in general.

In addition to using the micro-turbine as a stand-alone power generator, it is possible to implement the micro-turbine engine as a part of a combined heat and power system for single family homes. By doing so, each household can reduce carbon dioxide emissions by 1 ton per year. (See e.g. Pehnt, "Environmental impacts of distributed energy systems—the case of micro cogeneration." *Environmental Science and Policy*. Elsevier, Vol. 11, p 25-37. February 2008.) In addition, micro-turbine engines can use a wider variety of fuels—such as heating oil, ethanol, syngas, and natural gas—with negligible nitrogen and sulfur oxide emissions compared to those produced by fossil fuel power plants. (See e.g. Energy Nexus Group. "Technology characterization—micro-turbines". USA: Environmental Protection Agency. 2002). It is the opinion of the inventors that this technology will unlock a use case for a low cost prime mover that will enable the micro-CHP market.

SUMMARY OF THE INVENTION

The present invention defines, in various embodiments, the design architecture and manufacturing methods for creating an integrated small-scale turbo-generator, as well as a wide selection of other fluid flow devices. In one embodiment, the integrated small-scale turbo-generator according to the present invention consists of a core micro-turbine engine that is manufactured using conventional machining methods and can generate mechanical shaft power from hydrocarbon fuel, as well as an electric motor that can be used as both a starter motor and an electric generator and is mechanically linked to the micro-turbine engine, such that the overall system generates electric power from combusting hydrocarbon fuel.

The micro-turbine engine physically consists of stacked structural layers and a rotor disk. The geometry of the structural layers and the rotor disks is formed by extruding two-dimensional features along a single primary direction. This type of geometry is described herein as "vertically simple".

The vertically simple design allows each physical component to be manufactured using conventional 2.5-axis CNC milling or similar methods using conventional machine tools that are effective at creating contoured shapes along the planar directions but typically not along the out-of-plane direction, which reduces manufacturing costs. As used herein, the term "vertically" does not compel that the feature be machined or form in the vertical direction, but is used simply for convenience in describing one method, where the component is machined while fixtured to a horizontally oriented X-Y table, with a cutting tool mounted in a vertically disposed Z axis spindle.

The rotor disk also has a shaft on which at least two radial bearings sit in order to support the rotor when rotating. The shaft also is mechanically linked to the electric motor shaft, for example by a flexible shaft coupler. The rotor disk has a plurality of rotor blades on each side of the disk, forming the impeller blades of the compressor on one side and the turbine blades of the turbine on the other side. On the impeller blade side, the adjacent layer (i.e. the diffuser layer) contains a plurality of stator blades that act as the diffuser flow passages of the compressor. The diffuser layer also contains air exit ports. Adjacent to the diffuser layer is another structural layer containing the air inlet ports. On the turbine side, the adjacent layer (i.e. the NGV layer) contains a plurality of stator blades that act as the nozzle guide vanes of the turbine. The NGV layer also contains air inlet ports that connect to the combustor. The NGV layer also contains exhaust ports.

The combustor contains a fuel inlet port, a fuel igniter, and flow passage that accepts relatively cold compressed air from the compressor and expels heated air to the turbine with small pressure loss. The combustor structure may be separate from the compressor and turbine structure, but is still in fluid communication by means of external flow passages. Alternatively, the combustor structure may be attached to the compressor and turbine structure, and in fluid communication by means of internal flow passages built into the compressor and turbine structure.

The air enters through the inlet ports of the diffuser layer, and is compressed by the impeller blades of the rotor. The further pressurization is achieved in the diffuser passage, after which the air exits through the diffuser exit ports and into the combustion chamber, within which the hydrocarbon fuel is combusted and the compressed air is heated. The hot compressed air enters the NGV layer through the NGV layer inlet ports and is accelerated to higher velocities. Then the high speed hot compressed air passes through the turbine blades and turns the rotor to generate power necessary to compress the cold air, as well as generating additional power that is necessary to turn the electric motor. The air then exits the system through the exhaust ports.

The electric motor is used to start the micro-turbine engine by providing power to turn the rotor and compress incoming air. When the micro-turbine engine achieves self-sustaining operation, the electric motor is then operated in reverse as a generator. The mechanical shaft power from the micro-turbine engine turns the electric motor to generate electric power.

In one embodiment, this turbo-generator system may produce about 1-50 kilowatts or more of electric power with overall energy conversion efficiency in the range of about 5-10% or more. Therefore, it is suitable for use as a portable power generator for remotely deployed sensors, mechanical pumps, or other devices requiring either electrical or mechanical power. In another application, the small-scale turbo-generator may be used as a backup generator for a single family home, or as a combined heat and power system for a single family home or other similarly sized energy consuming application.

Optionally, it is possible to include a regenerative heat exchanger (recuperator) in the turbogenerator system. The recuperator has two counterflow paths. For one of the flow paths, the compressed cold air enters the recuperator and exits to the combustor instead of directly entering the combustor. For the other flow path, the turbine exhaust enters the recuperator and exits to the atmosphere instead of directly exiting to the atmosphere. The recuperator exchanges heat from the hot turbine exhaust air to the cold compressed air. This heats up the cold compressed air before it enters the combustor, and reduces the amount of fuel that must be combusted in order to bring the air up to the desired turbine inlet temperature. This increases the overall efficiency of the turbo-generator. The system may have an energy conversion efficiency in the range of about 10-20% or more.

Unlike micro gas-turbine engines that have been developed by MIT (see, e.g., U.S. Pat. Nos. 5,932,940 and 6,392,313 to Epstein et al) and the micro Rankine engine that has been developed by Frechette et al (see, e.g. U.S. Pat. No. 7,487,641 to Frechette et al), the micro-turbine of the present invention is manufactured and assembled using conventional machining methods instead of micro-electro-mechanical-system (MEMS) methods. The application range is also different due to the larger amount of power that may be generated: the micro-turbine of the present invention may generate electric power in the range of about 1-50 kW, while the micro gas-turbine engines built from silicon MEMS technology aim for electric power in the range of 1-100 W.

The micro-turbine technology described here enables an innovation in fluid flow and control systems that is based on successive layers of vertically simple, conventionally machined parts using, for example, milling machines, lathes, drill presses, water jet cutters, etc. Alternatively, rapid prototyping and metal sintering techniques can also be used to produce the components. The fluid channels developed between and across these layers can be used to make a variety of fluid based devices, such as heat exchangers, fuel distributors, and valve bodies or more complex systems such as turbines and Rankin cycle engines.

According to one aspect of the invention, a fluid delivery and control system includes at least two layers of substructures stacked along a primary direction. At least one layer of substructure is defined geometrically by extruding two-dimensional features along the primary stacking direction. The system forms one or more flow passages forming one or more flow paths of the fluid delivery and control system. The substructures may be manufactured of metal using conventional metal forming or machining processes. In various embodiments, the system may be a heat exchanger, a component of a turbomachine, a valve, a pump, a fluid mixing device, a Rankine cycle engine, an Otto cycle engine, a diesel cycle engine, a combined-cycle engine, a venturi, a valve body, or any component thereof.

According to another aspect of the invention, a micro-turbine engine includes at least one radial compressor stage, at least one radial turbine stage, and at least one combustor stage. Each stage may include at least one layer of substructure stacked along an axial direction of the engine having one or more features defined geometrically by extruding two-dimensional features along the axial direction. The stages form one or more flow passages forming one or more flow paths of the micro-turbine engine. The engine may be manufactured from metal using conventional metal forming or machining processes.

Optionally, the engine may include a mechanical connection to an electric motor adapted to start the engine and configured as an electric generator after self-sustaining operation of the engine is established to produce electrical power. Alternatively or additionally, the engine may be in fluid communication with an additional power turbine having a rotor layer of substructure that rotates independently of the radial turbine stage. There may also be a mechanical connection to a starter-generator combination electric motor to produce electrical power.

Still further, the engine may be in fluid communication with a counter-flow heat exchanger, where compressed inlet air enters a cold side of the heat exchanger before entering the combustor, and turbine exhaust air enters a hot side of the heat exchanger before exiting the engine, such that the turbine exhaust air transfers heat to the compressed inlet air in the counter-flow heat exchanger to reduce an amount of fuel used to operate the engine.

The engine may include a mechanical connection to a starter-generator combination electric motor adapted to start the engine and to be used as an electric generator after self-sustaining operation of the engine to produce electrical power. Alternatively or additionally, the engine may be in fluid communication with a turbine having a rotor layer of substructure that rotates independently of the radial turbine stage, with a mechanical connection to a starter-generator combination electric motor to produce electrical power.

BRIEF DESCRIPTION OF THE DRAWINGS

A more complete appreciation of the invention and many attendant advantages thereof will be readily obtained as the same becomes better understood by reference to the following detailed description when considered in connection with the accompanying schematic drawings.

DETAILED DESCRIPTION OF THE PREFERRED EMBODIMENTS

The present invention relates to various fluid delivery and control systems, including various types of turbomachinery and support equipment, as will be apparent to one of ordinary skill in the art from the description set forth herein. One type of fluid delivery and control system is a micro-turbine engine.

Figure 1:
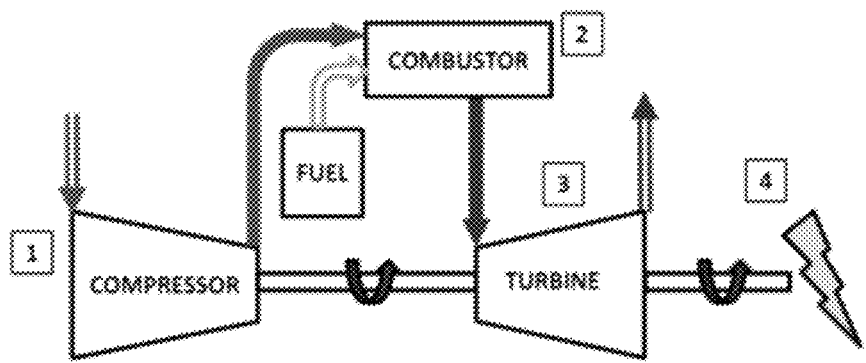
FIG. 1 provides a flow chart for the operation of a standard Brayton cycle micro-turbine, showing important components and the direction of flow.
Figure 2:
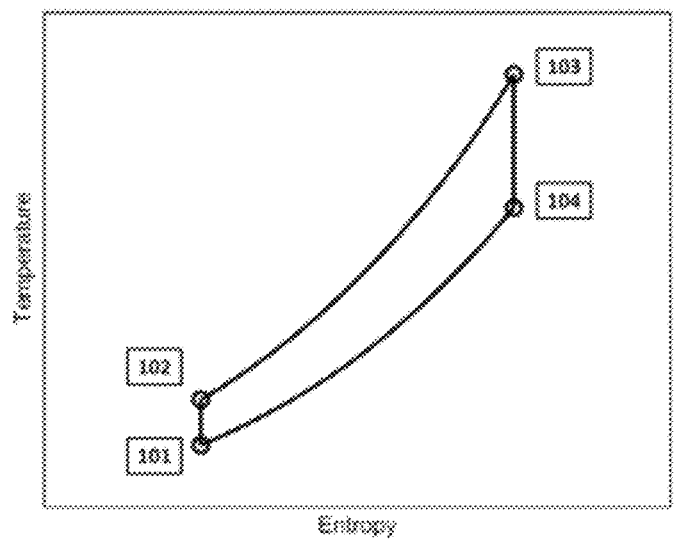
FIG. 2 provides a temperature-entropy diagram for a standard Brayton cycle, showing four states of the working fluid.

The general thermodynamic principles and operation of the micro-turbine engine are explained herein and accompanied by FIG. 1 and FIG. 2. The micro-turbine engine produces mechanical power through the Brayton cycle. FIG. 1 shows a flow-path diagram of the micro-turbine engine and the sequence of components through which the working fluid(s) and/or auxiliary fluid(s) pass during normal operation of the micro-turbine engine. In one embodiment of the standard Brayton cycle micro-turbine engine, the working fluid starts in ambient atmosphere, passes through the compressor, then combustor, then turbine, and finally exits back into the ambient. In step 1, the compressor draws in air from the atmosphere at ambient pressure and temperature and compresses the air to a higher pressure. Then in step 2 the compressed air is heated in the combustor at nearly constant pressure by burning fuel that is injected from the fuel tank. The high temperature and high pressure air does work on the turbine in step 3 to power the compressor as well as produce additional mechanical power. Finally in step 4, the turbine is mechanically connected to an electric generator, which produces electrical power using the excess mechanical power. The steps correspond to the numbered components in FIG. 1.

In terms of thermodynamic properties, the idealized operation of the engine is shown in FIG. 2 in the temperature-entropy diagram. The cycle starts at the lower left corner of the diagram with cold ambient air at state 101, and operates in a clockwise direction around the diagram. The vertical segment from 101 to 102 represents compression. The next segment from 102 to 103 represents heating at constant pressure. The second vertical segment from 103 to 104 represents power generation in the turbine. The last segment from 104 to 101 means cooling the hot exhaust, but during actual operation this is achieved by drawing in cold air from the ambient and expelling the hot exhaust.

Figure 3:
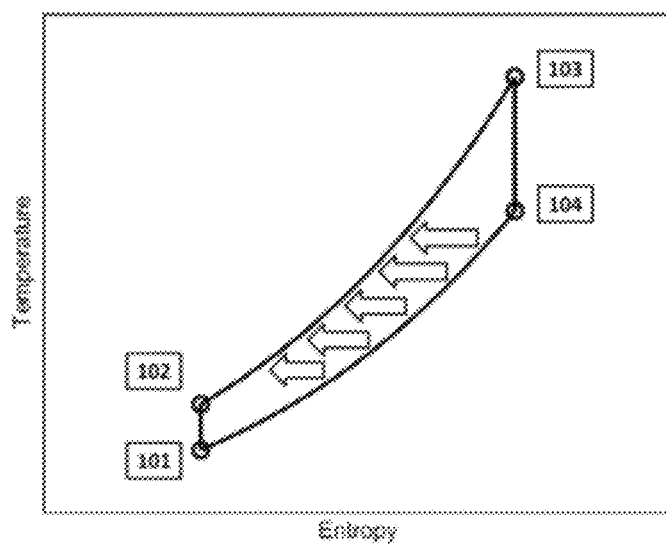
FIG. 3 provides a temperature-entropy diagram for a recuperated Brayton cycle, showing four states of the working fluid as well as block arrows that indicate the direction of heat transfer between the relatively hot exhaust and the relatively cold compressed air.

A variation on the basic Brayton cycle is a recuperated Brayton cycle, as shown in FIG. 3, in which heat transfer occurs between the hot turbine exhaust and the cold compressed air, such that less fuel is needed to bring the compressed air to turbine inlet temperature. This is demonstrated in FIG. 3 by the block arrows, which show the direction of heat transfer.

Figure 4:
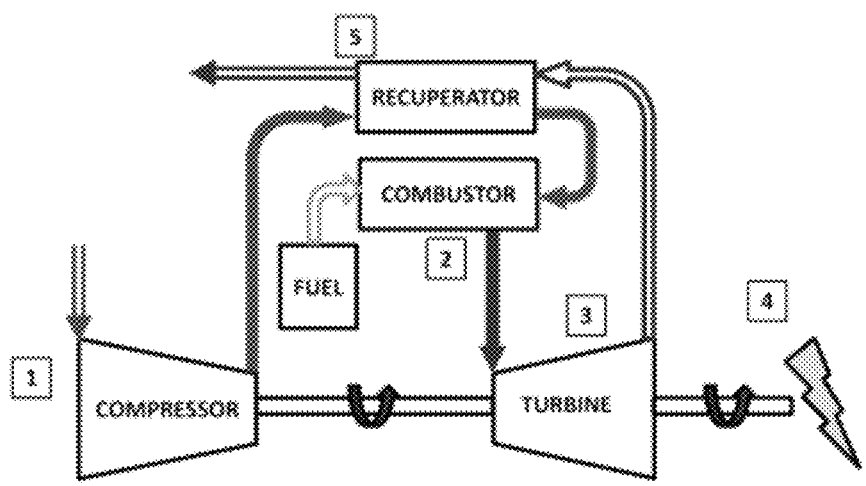
FIG. 4 provides a flow chart for the operation of a recuperated Brayton cycle micro-turbine, showing important components and the direction of flow.

One embodiment of the recuperated Brayton cycle micro-turbine engine is achieved by adding a heat exchanger comprising two groups of flow paths—hot flow paths and cold flow paths. The compressed air enters the cold flow paths before entering the combustor, and the turbine exhaust enters the hot flow paths before exiting the micro-turbine engine system. The flow path for the recuperated micro-turbine engine is shown in FIG. 4. In component 1, the cold air is pressurized in the compressor. Then the cold compressed air is heated by the hot exhaust air in the recuperator labeled by component 5.

Then in component 2 the fuel is injected into the combustor and burned to heat up the compressed air at nearly constant pressure up to the desired turbine inlet temperature. In component 3, the turbine extracts the energy of the compressed air and the exhaust enters the recuperator. Finally, the excess mechanical power is used to turn an electrical generator indicated by component 4 that generates electric power.

Figure 5:
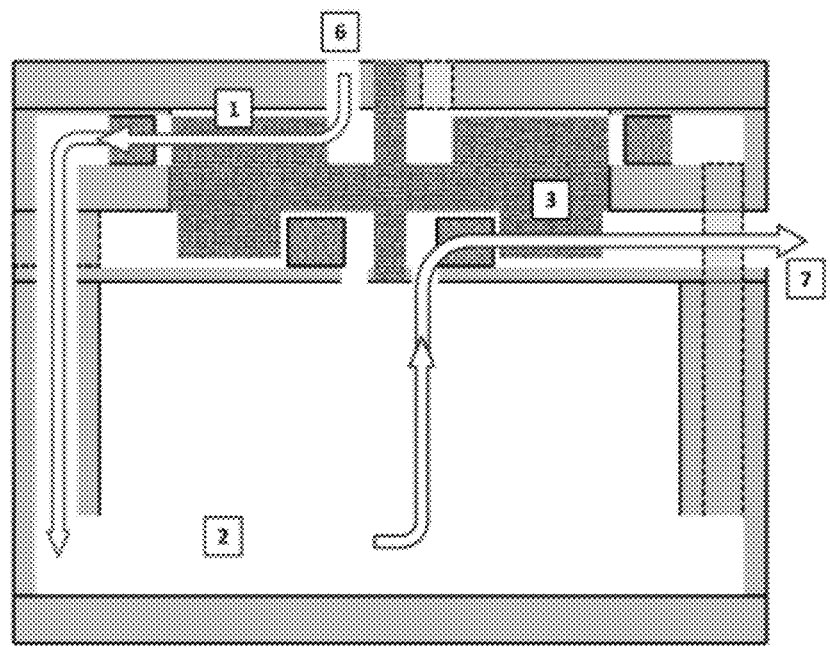
FIG. 5 provides a schematic for the cross section of a micro-turbine engine with a combustor that is integrated with the other components of the micro-turbine.

One objective of the invention is to create at least portions of the overall structure of the micro-turbine engine using layers of substructure that are stacked along a primary direction, and each layer of substructure is formed geometrically, but not necessarily manufactured, by extruding one or more two-dimensional patterns along the primary stacking direction. The term "extruding" is being used herein, for simplicity, to represent the projection of a contour, profile, outline, etc. of a component feature along as axis. In particular, by implementing this design methodology, the specific layered geometry allows a designer to build parts that are manufactured using conventional machining methods or metal forming methods including, but not limited to, 2.5-axis CNC milling, laser cutting, waterjet cutting, electrical discharge machining, etc. FIG. 5 shows a diagram of different substructure layers that form the overall structure of one embodiment of the micro-turbine engine. In this particular embodiment, cold air flows into the engine from the top through the engine air inlet indicated by component 6, gets compressed by the compressor labeled by component 1, becomes heated in the combustor labeled by component 2, and then turns the turbine rotor labeled by component 3 before exiting the engine through the exhaust indicated by component 7.

One benefit of using this design methodology is significantly reduced manufacturing cost from a combination of using common materials as well as cheaper manufacturing methods. However, in implementing simple contour geometries for the engine components in the present invention, the efficiency of the engine in converting fuel chemical energy to electrical energy maybe reduced somewhat.

Figure 6:
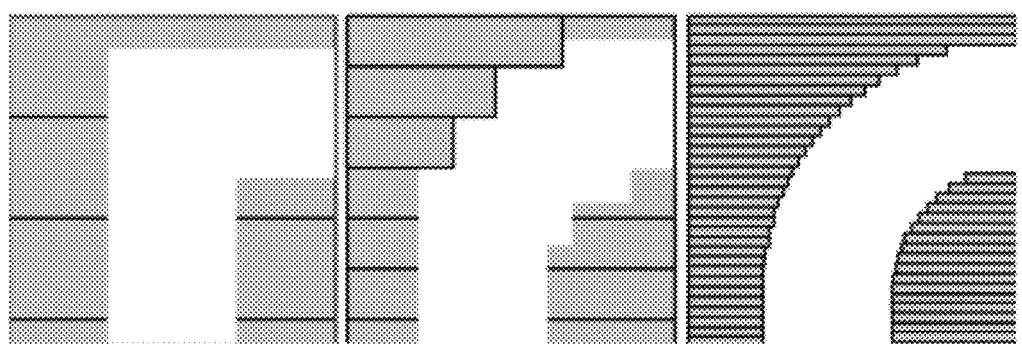
FIG. 6 delinates one method for improving the resolution of features created from vertically simple components by using more layers whose thicknesses are much smaller than the length scale of the feature.

The resolution of contours in the engine components is improved by designing the components with a larger number of layers, thereby increasing efficiency. This is functionally equivalent to reducing the effect of each layer on flow characteristics to de-facto surface roughness. This occurs when the height of a layer is less than about 10% of the characteristic length of more dominant flow features. FIG. 6 shows a diagram of how successive structural layers are used to develop contours in the overall structure using the example of a 90-degree turn. In the left-most subfigure the 90-degree turn occurs with a sharp corner because the structure comprises layers of vertically simple structures whose thicknesses are on the order of the bend radius. In the middle subfigure, thinner layers of vertically simple structures are used to create a rough approximation of an elbow. In the right-most subfigure, layers whose thicknesses are on the order of 10% of the bend radius are used to form a finer approximation of an elbow.

One preferred embodiment has a rotor diameter that is small compared to conventional turbine engines. As a result, viscous effects are stronger and cause further reductions in engine efficiency. In order to design a viable engine with both portability and efficiency, it is important to consider the penalties associated with smaller engines.

Figure 7:
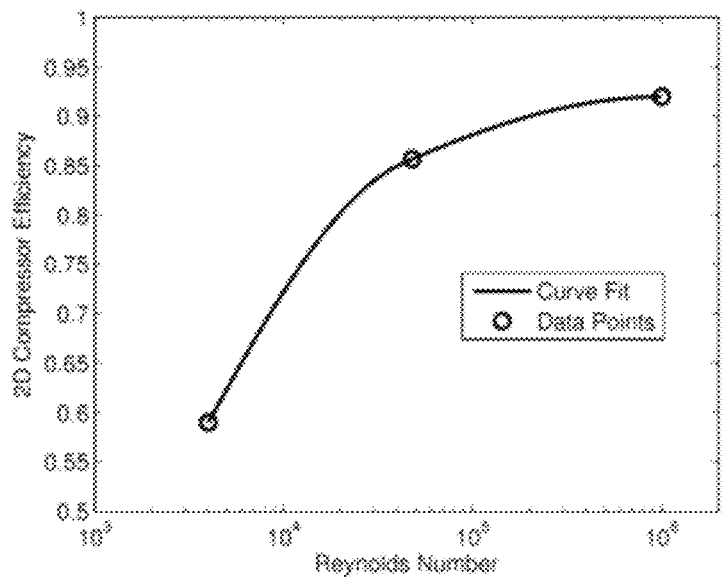
FIG. 7 shows a correlation between two-dimensional compressor isentropic efficiency versus the Reynolds number defined relative to the compressor blade chord.

FIG. 7 shows a curve fit between 2D compressor efficiency and Reynolds number based on rotor diameter. The data points are obtained from a reference such as Lang et al., "Multi-Wafer Rotating MEMS Machines: Turbines, Generators, and Engines" Springer Verlag. (2009), which discusses 2D numerical simulations of compressor efficiency that only account for viscous effects over blade surfaces.

The inefficiency, which is one minus the efficiency, is doubled when estimating the isentropic efficiency of the compressor including all 3D effects, as suggested in Lang. Lastly, the turbine efficiency is 10% lower than the compressor efficiency, also as discussed in Lang. The relation is used to estimate compressor and turbine efficiencies for different rotor diameters in the initial design, in order to give a quick estimate of system thermal efficiency while including the length scale effects.

It is also important to determine the viable design space for various embodiments of the present invention. Some of the primary design variables are the engine rotor diameter and the rotor rotation rate. Magnitude of rotor diameter affects the influence of viscous losses, and rotor rotation rate affects engine pressure ratio as well as micro-turbine flow characteristics. Therefore, it is important to perform an initial design analysis to determine viable regions of the design space. The rotor diameter is varied over three orders of magnitude. The range of rotation rates is specified relative to the maximum allowable rotation rate, which is, with a safety factor, the rotation rate at which a uniform disk of the specified rotor diameter fails under centrifugal loading. The results presented here are from calculations using material properties of 4340 alloy steel.

Figure 8:
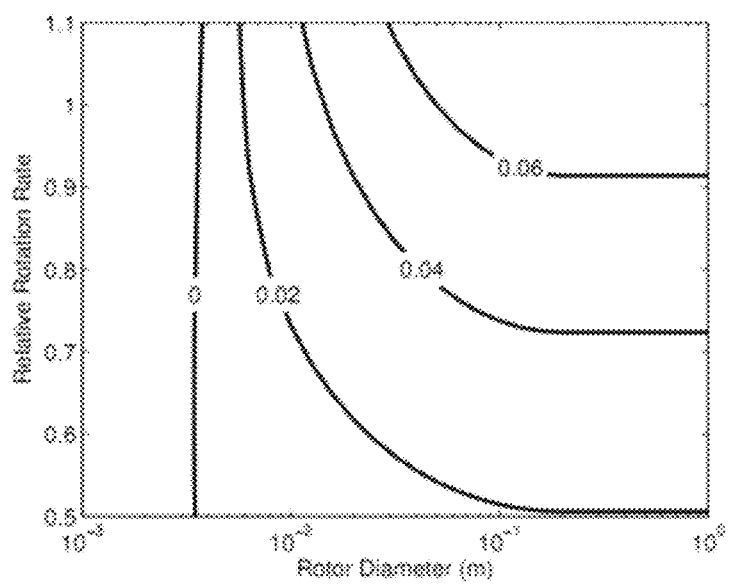
FIG. 8 provides a contour plot with lines of constant thermal efficiency that are theoretically computed for a standard Brayton cycle micro-turbine.

FIG. 8 shows contours of constant thermal efficiency over the design space. The x-axis displays the range of rotor diameters from 1 mm to 1 m on a logarithmic scale; the y-axis displays the ratio of specified rotation rate to maximum allowable rotation rate, herein referred to as the "relative rotation rate", on a linear scale. The thermal efficiency is estimated by estimating the compressor pressure ratio from the tip speed, and using correlations for compressor and turbine isentropic efficiencies. First, the results show that thermal efficiency decreases more rapidly with rotor diameter when the rotor diameter is less than 10 cm.

The second trend is that the efficiency increases with rotation rate. This is because the compressor pressure ratio is higher, leading to higher thermal efficiency. The rotation rate of various embodiments of the present invention is limited by centrifugal stresses, creep, and elastic deformation under load for the selected material. Higher rotation rate, and therefore efficiency, can be achieved with the use of stronger materials.

Figure 9:
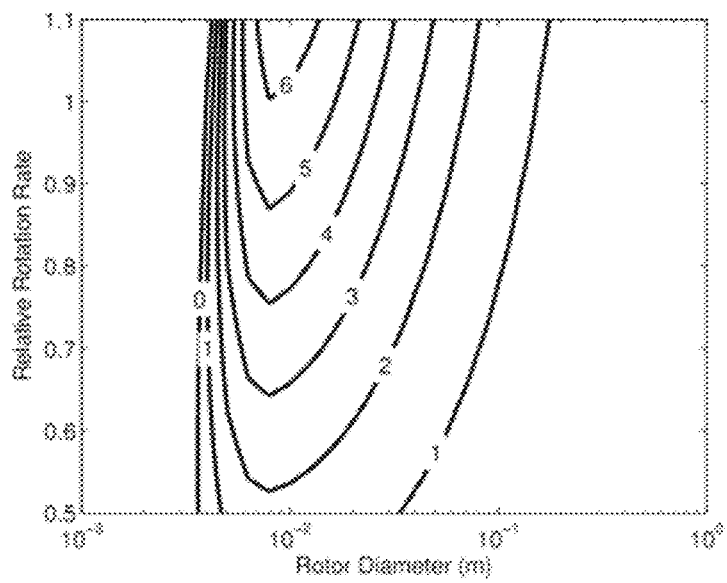
FIG. 9 shows a contour plot with lines of constant power density in Megawatts per cubic meter that are theoretically computed for a standard Brayton cycle micro-turbine.

FIG. 9 shows contours of estimated power density over the design space. The power density is estimated by assuming that the engine volume is a cube whose sides have length equal to twice the rotor diameter, and dividing the total power output by the estimated volume. The trend shows increasing power density with decreasing rotor diameter up to a diameter of 1 cm, at which point the power density drops rapidly due to the dominance of viscous effects.

The combined results from FIG. 8 and FIG. 9 show that a rotor diameter on the order of 10 cm results in a compromise of acceptable efficiency and high power density. When compared to prior art devices, the proposed length scale according to the present invention is about one order of magnitude smaller than conventional aircraft engines, and about one order of magnitude larger than silicon microturbomachinery.

Figure 10:
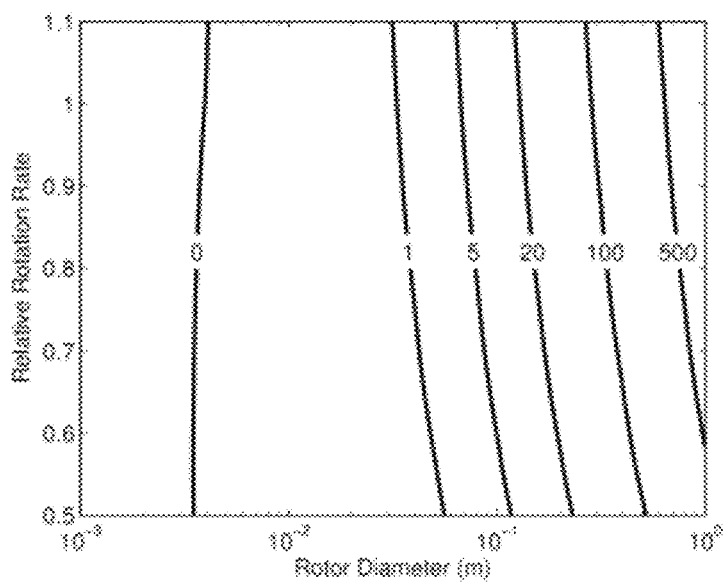
FIG. 10 provides a contour plot with lines of constant power output in Kilowatts that are theoretically computed for a standard Brayton cycle micro-turbine.

Theoretical predictions for power output of a non-recuperated micro-turbine engine versus the engine rotation speed are shown in FIG. 10. The estimated power output is between about 1 to about 20 Kilowatts or more in the proposed region of the design space, and the power output increases rapidly with small increases in rotor diameter. Compared to prior art devices pertaining to silicon microturbomachinery, embodiments of the present invention have an estimated power output that is about one to two orders of magnitude larger.

Figure 11:
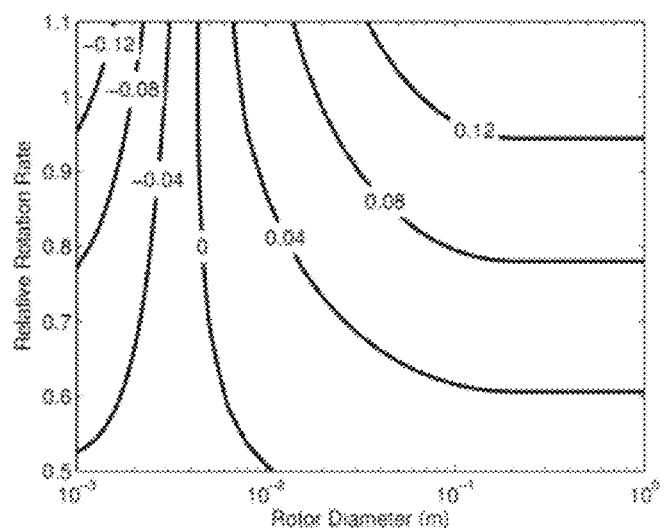
FIG. 11 shows a contour plot with lines of constant thermal efficiency that are theoretically computed for a recuperated Brayton cycle micro-turbine.

Increases in efficiency due to incorporating the recuperator in the micro-turbine system are also provided. The theoretical prediction for thermal efficiency over the above-referenced design space for the recuperated micro-turbine engine is shown in FIG. 11. The results are computed using an assumed recuperator pressure ratio of 97% and recuperator effectiveness of 85%. As seen when compared to FIG. 8, the recuperator on average increases the efficiency of the micro-turbine engine by about 5-10 percentage points.

After determining the design space, the geometry of the engine is designed using conservation laws for mass, momentum, angular momentum, and energy.

Figure 12:
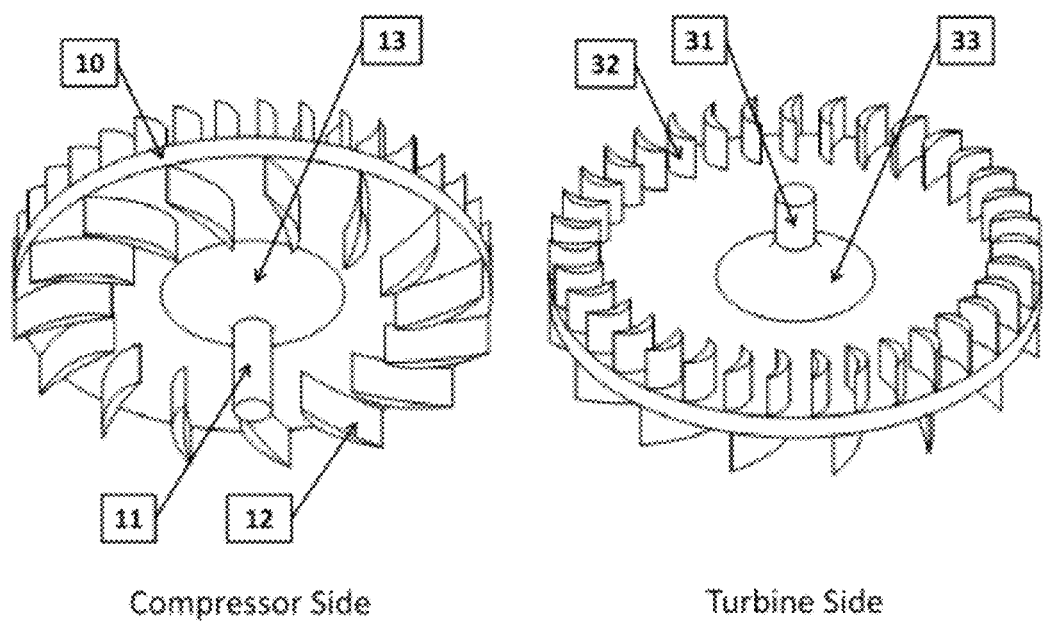
FIG. 12 provides drawings of one embodiment of the micro-turbine rotor viewed from two different perspectives, one from the compressor side and one from the turbine side.

The rotor disk of one preferred embodiment of the micro-turbine is shown in FIG. 12 from two different perspective views. The rotor is a single substructure including a rotating disk (10), a plurality of compressor blades (12) geometrically formed by extruding two-dimensional blade profiles from one side of the disk along the axial direction, and a plurality of turbine blades (32) geometrically formed by extruding two-dimensional blade profiles from the other side of the disk along the axial direction. In addition, the compressor-side and turbine-side rotor shafts (11 and 31) and the fillets (13 and 33) are integral features of the rotor. The rotor may be machined from a single forging.

Figure 13:
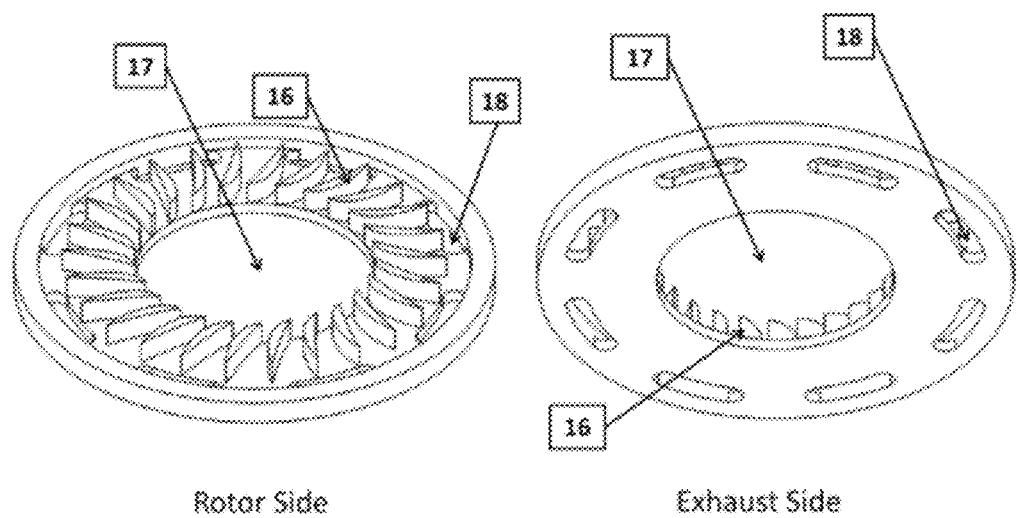
FIG. 13 provides drawings of one embodiment of the diffuser layer viewed from two different perspectives, one from the side with diffuser vanes and one from the opposite side.

One embodiment of the diffuser layer is shown in FIG. 13. This particular layer contains a plethora of diffuser blades (16), space for the rotor to reside (17) in the center of the component, and diffuser exit ports (18) near the periphery of the component. This particular design is a radial outflow compressor, so the air starts near the center and flows radially outwards as it is compressed.

Figure 14:
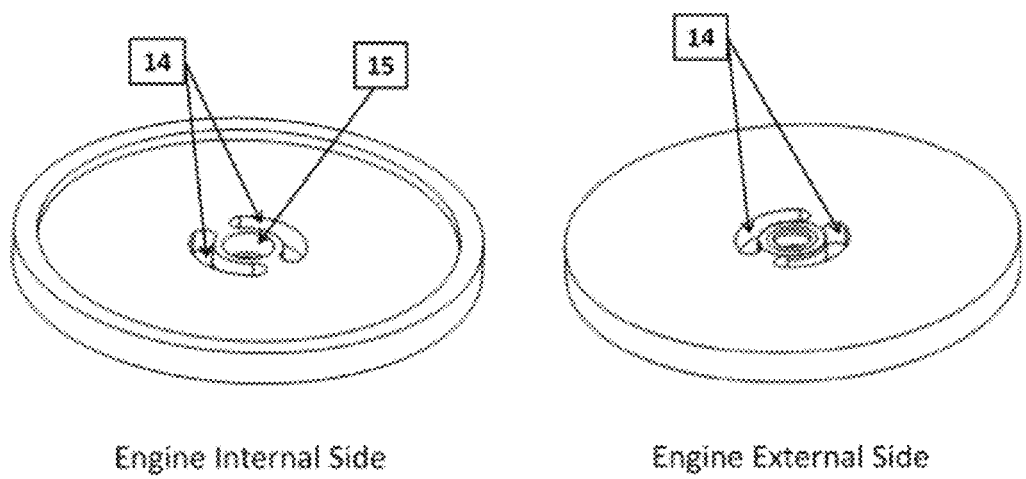
FIG. 14 provides drawings of one embodiment of the compressor lid viewed from two different perspectives, one from the side with the bearing seat and one from the opposite side.

The compressor side of the engine is capped by a compressor lid, as shown in FIG. 14. The particular compressor lid shown in the figure contains two air inlet ports (14) surrounding a radial bearing housing (15), through which the compressor side of the rotor disk shaft is supported.

Figure 15:
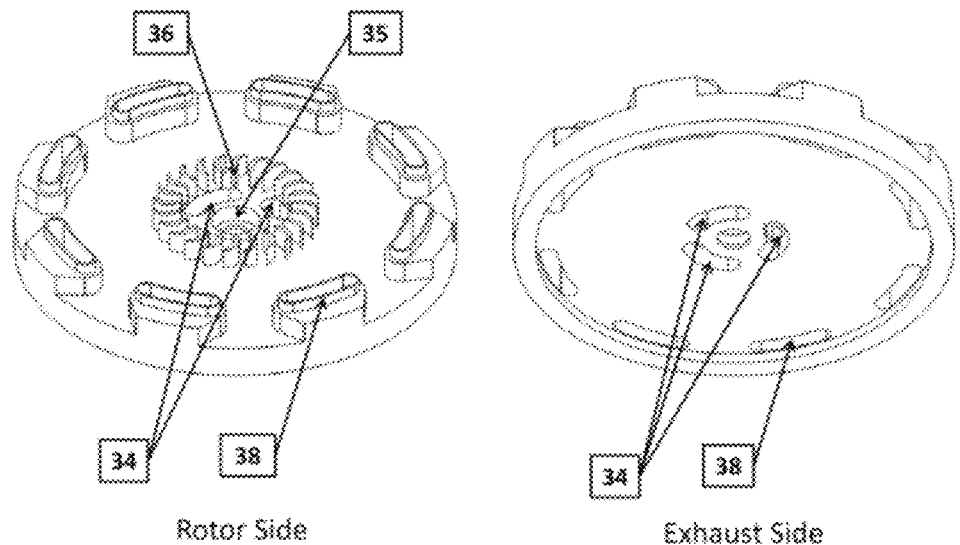
FIG. 15 provides drawings of one embodiment of the nozzle guide vane layer viewed from two different perspectives, one from the side with nozzle guide vanes and one from the opposite side.

One embodiment of the nozzle guide vane layer, herein referred to as the "NGV layer", is shown in FIG. 15. This particular layer contains a plurality of nozzle guide vanes (36) near the center of the component, three turbine air inlet ports (34) inside the annulus of nozzle guide vanes, and eight turbine air exhaust ports (38) near the periphery of the component. The NGV layer also houses a radial bearing in the recess (35) at the center of the layer, through which the turbine side of the rotor disk shaft is supported. This particular design is a radial outflow turbine, but the present invention is not limited to using a radial outflow configuration. Further, the depicted number of component features (e.g., blades, vanes, inlets, outlets, etc.) in the various components depicted is by way of example only.

Figure 16:
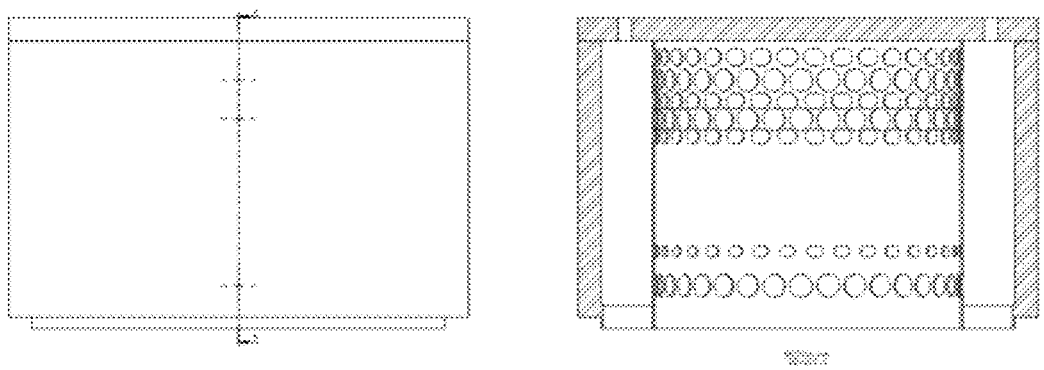
FIG. 16 provides a drawing of the outer shell and a drawing of the cross section of one embodiment of the combustor.

One embodiment of a combustor that is a component of the primary micro-turbine structure is shown in FIG. 16. The combustor is in fluid communication with the compressor and turbine via internal flow channels that are formed by cut-outs in the micro-turbine engine substructure layers. The flow channels connect the combustor to other engine components in the desired flow sequence shown in FIG. 1. Fuel is injected into the combustor and then ignited. This combustor contains a flame holder made of perforated sheet metal to sustain combustion, as seen in the cross section view in FIG. 16.

The combustor does not need to be attached directly to the rest of the micro-turbine. In an alternative embodiment, the combustor is in fluid communication with the compressor and turbine via external flow channels that connect the components in the desired flow sequence shown in FIG. 1.

The combustor can use a variety of fuels, including but not limited to gasoline, ethanol, propane, natural gas, syngas, etc.

Figure 17:
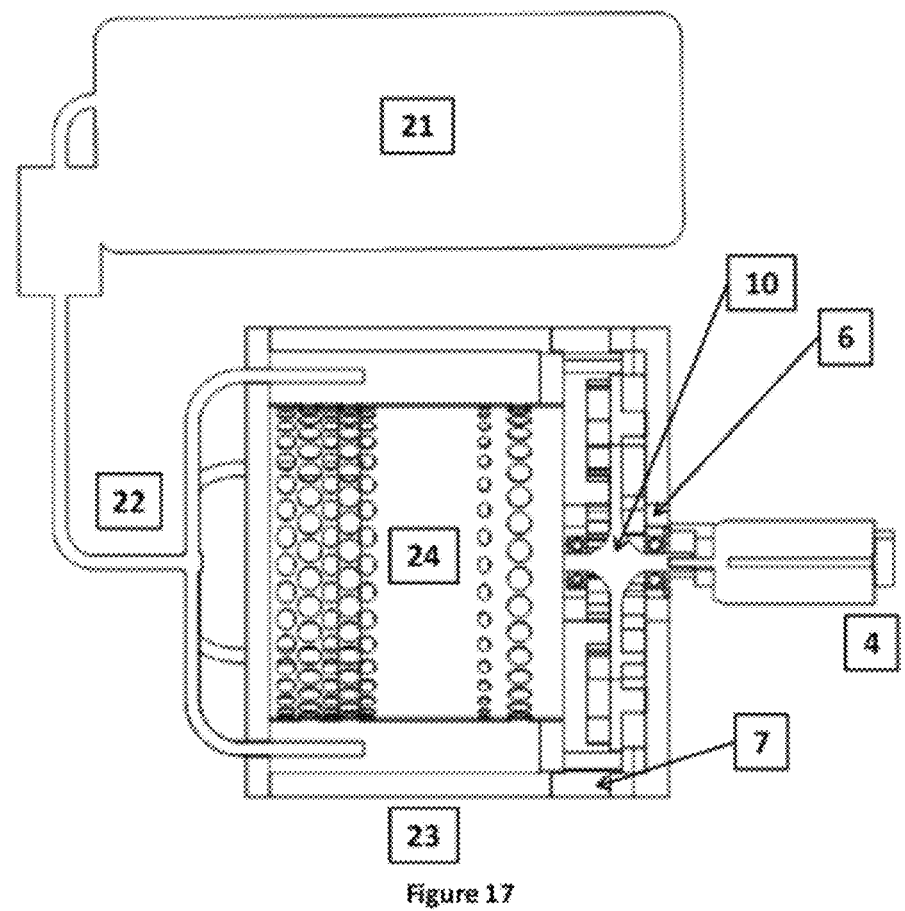
FIG. 17 provides a drawing of the cross section of a turbo-generator system consisting of a micro-turbine engine, fuel system, and electrical generator.

FIG. 17 shows a power generating system comprising a micro-turbine engine and an electric motor that are joined together by a shaft coupler. The turbomachinery system comprises the rotor disk, the structural layers that contain the stator blades, the compressor lid, and the bearings. Cold air enters the engine through the air inlet indicated by label 6. The fuel tank system (21) supplies fuel to the combustor via the fuel line and injector system (22). The relatively cold compressed air is heated by burning the fuel from the fuel tank within the combustor outer shell (23). One embodiment of the flame holder (24) inside the combustor is a thin cylindrical shell with holes radially and axially distributed along the cylinder. After the turbine extracts power from the heated gas, the gas then exits the turbine through the exhaust port (7). Finally, the electric motor (4) is connected to the turbine rotor shaft. The mechanical shaft power produced by the micro-turbine engine is used to turn the electric motor, which converts shaft power to electrical power.

Figure 18:
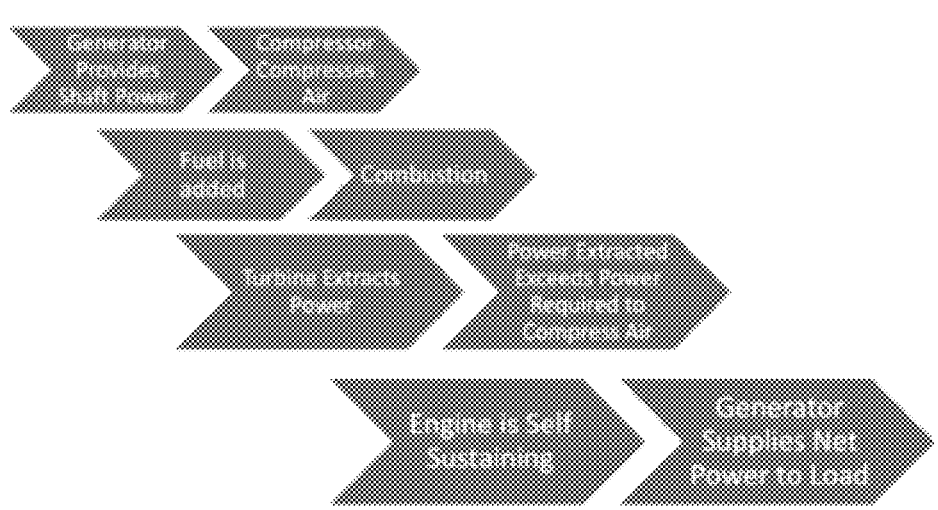
FIG. 18 provides a flow chart for operating the micro-turbine from start up to self-sustaining operation.

FIG. 18 shows the steps for operating the micro-turbine engine. When the micro-turbine engine is not yet in operation, the electric motor is used as a starter-motor that takes power from a portable or non-portable source and spins the micro-turbine rotor to pressurize air. At the same time, fuel is added and burned in the combustor. The hot compressed air then powers the turbine, which reduces the power required by the starter-motor to sustain operation. Eventually the micro-turbine engine begins to produce positive net power, at which point the starter-motor is switched to an electric generator. In one preferred embodiment in which the motor is an induction motor, the switching between motor and generator modes is automatic. For other types of motors, a more sophisticated system is employed for switching between motor and generator modes, as known by those skilled in the art.

Figure 19:
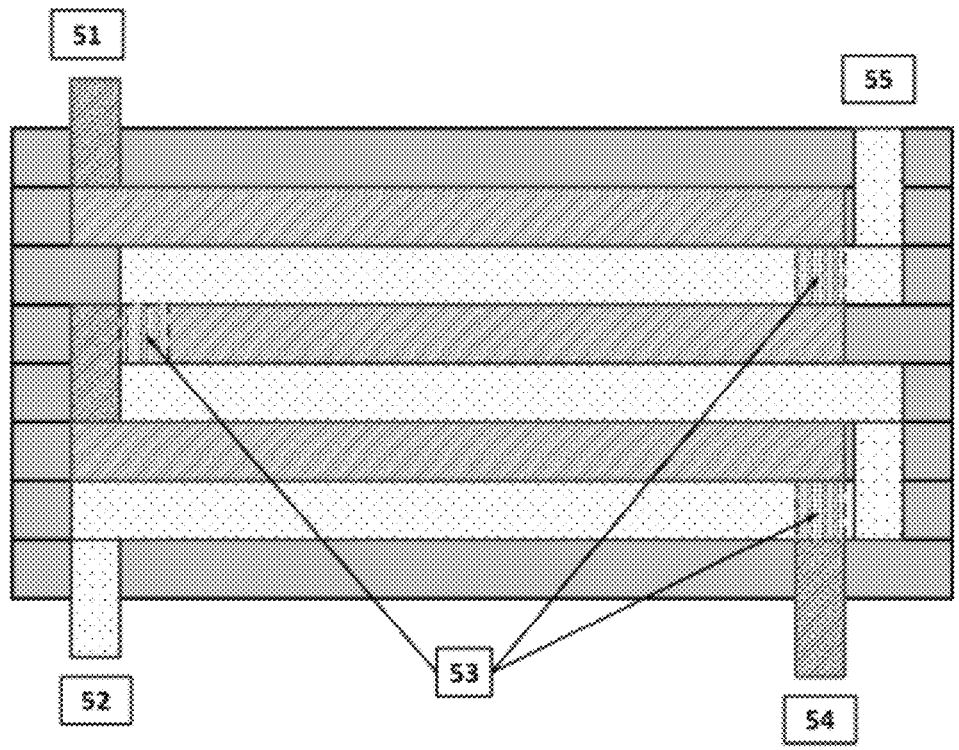
FIG. 19 provides a schematic for a cross section of one embodiment of a counter-flow heat exchanger.

The above descriptions detail the principles of operation, the design methodology, and the architecture of one embodiment of a micro-turbine. The same layer design is implemented to create an assortment of other fluid flow and control devices, in addition to turbomachinery components. For example, FIG. 19 shows a layer diagram for one embodiment of a counter flow heat exchanger. Label 51 and label 52 indicate two flow paths of the heat exchanger. The fluid in one flow path flows into the system (51), and the fluid in the other flow path flows in the opposite direction starting at the other inlet (52). Label 53 indicates regions where the flows cross each other in the projected view shown in FIG. 19. In practice, the flow path turns are staggered along the direction along which the 2D projection for FIG. 19 is made such that the flow paths remain separate. In one embodiment of a recuperated micro-turbine engine, a heat exchanger of this design is connected to a micro-turbine, such that the exhaust of the turbine flows through the hot flow path out to ambient, and the compressed cold air from the compressor flows through the cold flow path into the combustor, during which process there is heat exchange between the compressor flow and the turbine exhaust.

Figure 20:
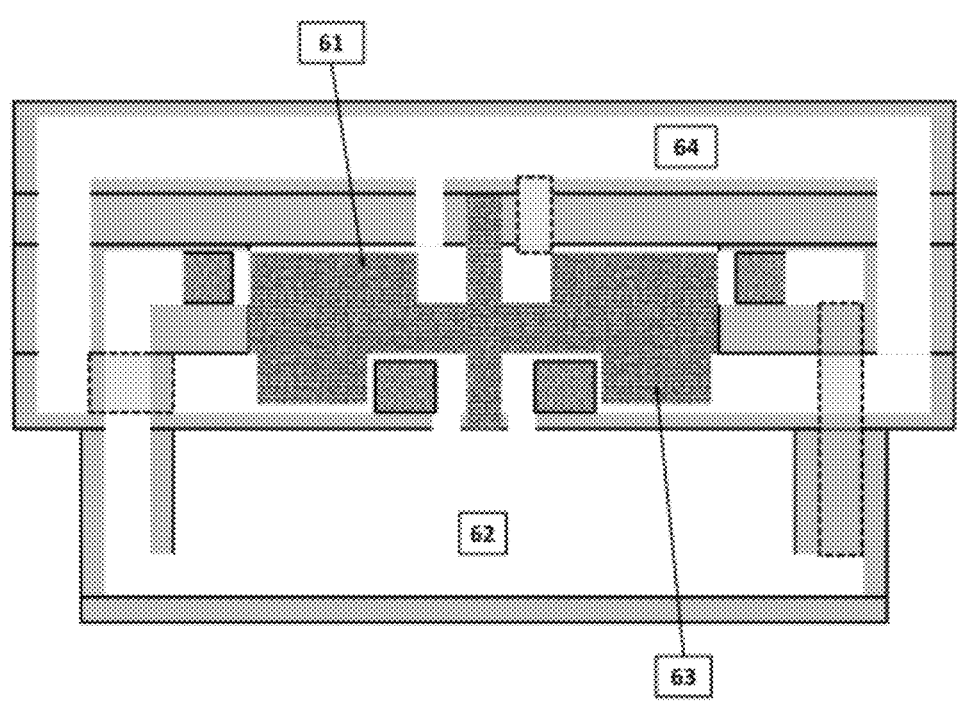
FIG. 20 provides a schematic for a cross section of one embodiment of a Rankine cycle engine, showing important components of the engine.

FIG. 20 shows the layer diagram for a Rankine cycle engine that has a closed system. The particular embodiment operates in a standard Rankine cycle, where the working fluid in liquid phase enters the compressor (61) and is pressurized, heated by a combustor (62) or other heat exchanger device into vapor, expanded in the turbine (63) to generate shaft power, and condensed back into liquid in a condenser (64) before entering the compressor again.

Figure 21:
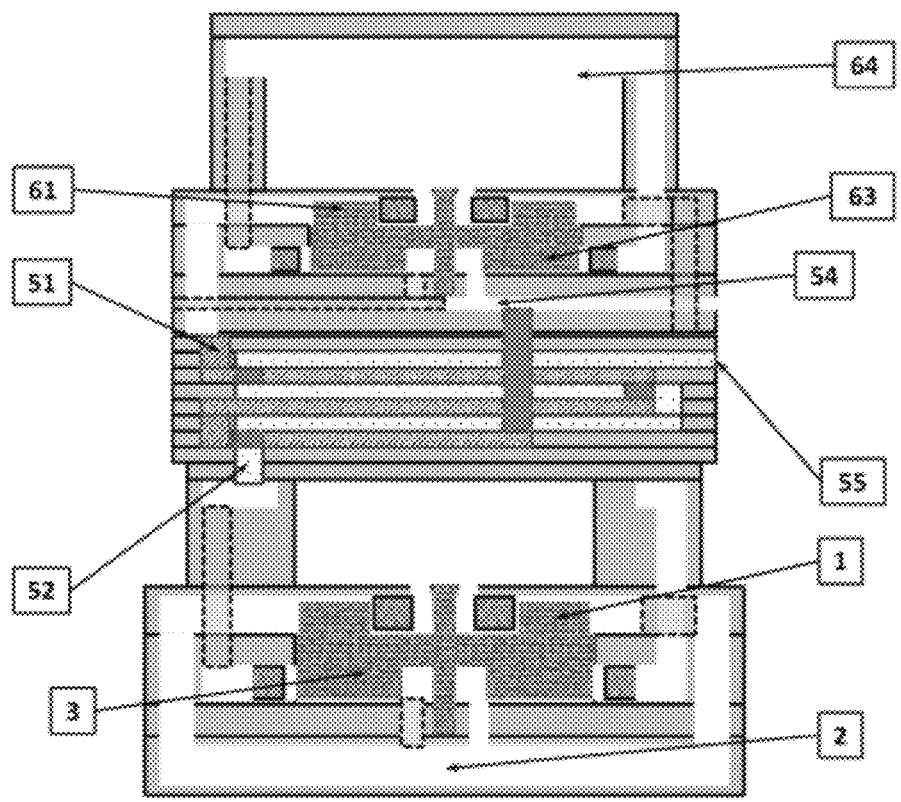
FIG. 21 provides a schematic for a cross section of one embodiment of a combined-cycle power plant consisting of a Brayton cycle engine, a Rankine cycle engine, and a counter-flow heat exchanger.

FIG. 21 shows the layer diagram for a combined-cycle engine where the exhaust of the Brayton cycle micro-turbine engine is routed into a heat exchanger connected to a Rankine cycle engine such that the turbine exhaust heats up the working fluid of the Rankine cycle engine. In the particular embodiment, the Brayton cycle engine is at the bottom of FIG. 21. First, relatively cold air enters the engine and is compressed by the compressor (1). Then the pressurized air is heated in the combustor (2). Then the heated gas is expanded in the turbine (3) to generate power. Instead of exhausting the heated gas to ambient, the exhaust from the Brayton cycle engine enters a heat exchanger through one of the inlets (52). The system is topped by a Rankine cycle engine, in which working fluid in liquid phase is first pressurized in a compressor (61). Then the liquid enters the heat exchanger through the other inlet (51) and is heated to vapor by the Brayton cycle exhaust. The now-heated vapor returns back into the engine through its flow path exit (54) and enters the turbine. The vapor expands in the turbine (63) and generates power. The vapor is condensed back into a liquid in the condenser (64) of the Rankine engine to complete the thermodynamic cycle. Lastly, the Brayton cycle exhaust leaves the heat exchanger through its flow path exit (55).

Figure 22:
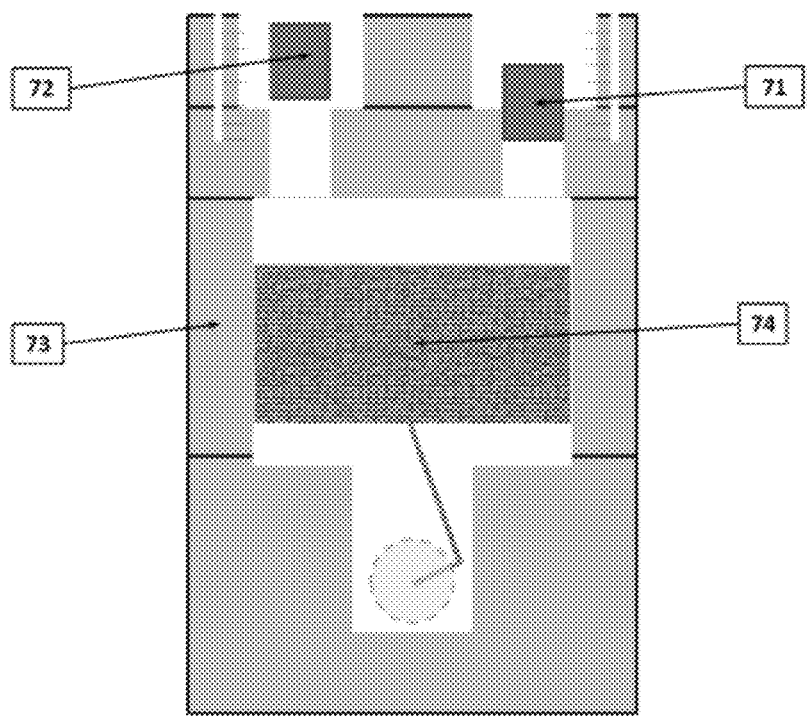
FIG. 22 provides a schematic for a cross section of one embodiment of a piston and cylinder system that can be used in a reciprocating piston engine.

FIG. 22 shows the layer diagram for a reciprocating piston engine design, where the intake valves (71), exhaust valves (72), piston housing (73), and piston (74) are all designed with vertically simple geometry.

Figure 23:
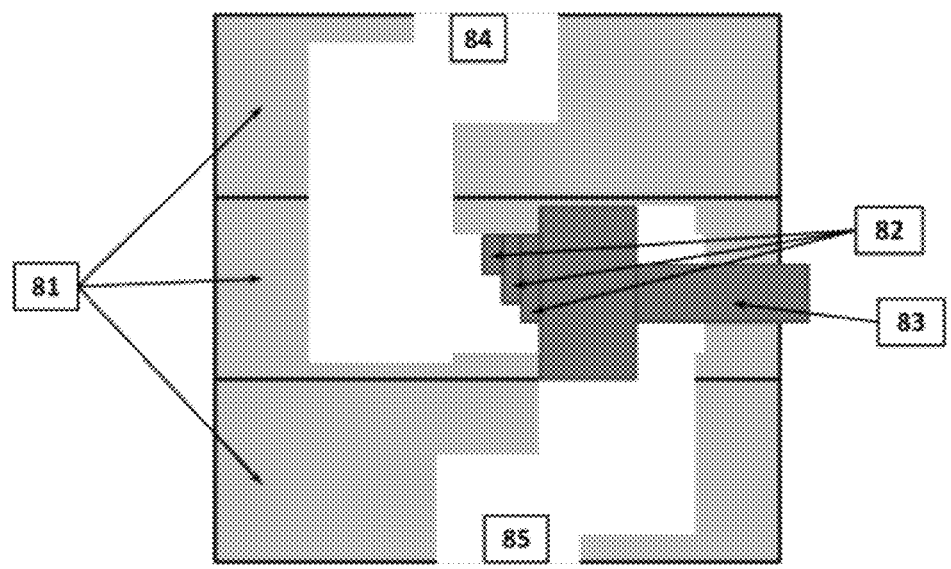
FIG. 23 provides a schematic for a cross section of one embodiment of a flow control valve.

FIG. 23 shows the layer diagram for a valve system whose flow passage and valve are formed from components with vertically simple geometry. One embodiment shown in FIG. 23 includes structural layers (81) that form the flow path for the valve, three different flow restrictions (82) that have vertically simple geometry, and a retractable beam (83) that blocks the flow if fully extended and controls flow rate by setting the flow restriction when partially retracted. The flow enters the valve through the inlet (84) and exits through the outlet (85).

Figure 24:
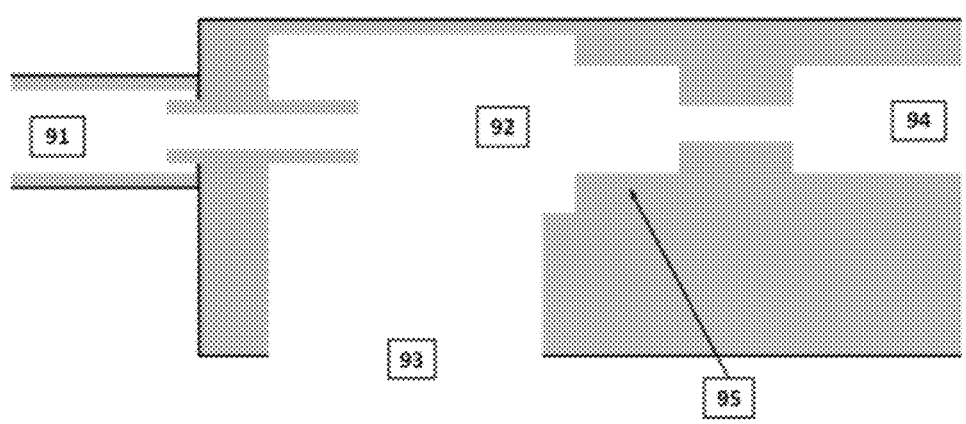
FIG. 24 provides a schematic for a cross section of one embodiment of a venturi mixer.

FIG. 24 shows the layer diagram for a venturi mixing system whose flow passages consist of components that have vertically simple geometry. The primary flow enters at the inlet (91), causes low pressure at the mixing region (92), and draws in the secondary flow (93). The two flows mix in the nozzle before exiting the system through the outlet (94). Label 95 shows that the nozzle is created from vertically simple geometry using stepped changes in cross sectional area of the nozzle.

Figures 25, 26:
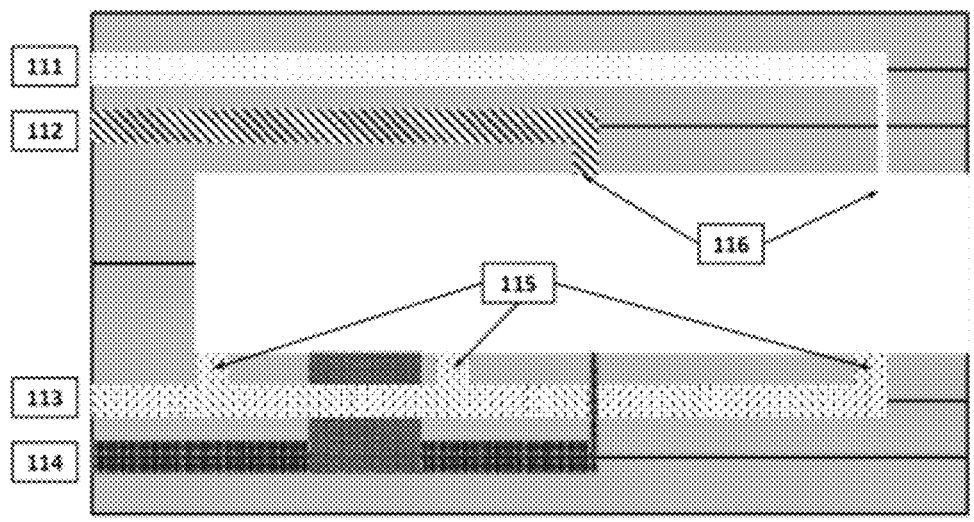
FIG. 25 provides a schematic for a cross section of one embodiment of a generic fluid mixing device, showing multiple flow passages and one or more exits for each flow passage.
FIG. 26 provides a table of performance parameters associated with various embodiments of the micro-turbine. An approximate lower bound, an approximate upper bound, and an approximate nominal value are provided for each parameter.

FIG. 25 shows the layer diagram for one embodiment of a generic fluid mixing device, whose flow passages are formed from components with vertically simple geometry. The fluids enter the mixer at labels 111, 112, 113, and 114. Label 115 points to the exits of one set of flow paths. More than one exit can be placed to control the uniformity of the mixing. Label 116 points to the exits of two different flow paths. Changing the cross sectional area of the flow paths controls the exit velocity and the mass flow.

FIG. 26 is a table of exemplary parameters and values associated with various embodiments of the invention. The table lists an approximate lower bound, an approximate upper bound, and an approximate nominal value for each parameter. These parameters and values are being presented by way of example only and should not be considered as limiting.

The foregoing discussion discloses and describes merely exemplary embodiments of the present invention. As will be understood by those skilled in the art, the present invention may be embodied in other specific forms without departing from the spirit or any essential characteristics thereof. Various elements may be combined in different numbers, combinations, and permutations. Various steps as described in the figures and the specification may be added or removed from the processes described herein, and the steps described may be performed in any alternative order. All such variants are considered to be within the scope of the invention. Accordingly, the disclosure of the present invention is intended to be illustrative, but not limiting, of the scope of the invention, which is to be defined solely by the following claims, as well as all structural, functional, and/or legal equivalents.

What is claimed is:

1. A micro-turbine engine comprising
at least one combustor stage,
at least one radial outflow compressor stage and
at least one radial outflow turbine stage,
wherein each of the at least one radial outflow compressor stage and the at least one radial outflow turbine stage comprises at least one layer of substructure that is stacked along an axial direction of the engine and that comprises features defined geometrically by extruding two-dimensional shapes only along the axial direction of the engine, wherein the features form one or more flow passages forming one or more flow paths of the micro-turbine engine, and wherein the features of the at least one layer of substructure comprise rotating blades, and wherein the rotational axes of the at least one radial outflow compressor stage and the at least one radial outflow turbine stage are axially aligned.

2. The micro-turbine engine of claim 1, wherein the at least one combustor stage is axially offset from the at least one radial outflow compressor stage and at least one radial outflow turbine stage.

3. The micro-turbine engine of claim 2, wherein the at least one combustor stage is in fluid communication with the at least one radial outflow compressor stage through an external flow channel configured to deliver compressed air from the at least one radial outflow compressor stage to the at least one combustor stage, and wherein the at least one combustor stage is in fluid communication with the at least one radial outflow turbine stage through an external flow channel configured to deliver heated compressed air from the at least one combustor stage to the at least one radial outflow turbine stage.

4. The micro-turbine engine of claim 1, wherein the at least one combustor stage is axially aligned with the at least one radial outflow compressor stage and at least one radial outflow turbine stage.

5. The micro-turbine engine of claim 4, wherein the at least one combustor stage is in fluid communication with the at least one radial outflow compressor stage through an internal flow channel configured to deliver compressed air from the at least one radial outflow compressor stage to the at least one combustor stage, and wherein the at least one combustor stage is in fluid communication with the at least one radial outflow turbine stage through an internal flow channel configured to deliver heated compressed air from the at least one combustor stage to the at least one radial outflow turbine stage.

6. The micro-turbine engine of claim 1, wherein the micro-turbine engine is configured to produce a power output in a range of 1 kW to 50 kW.

7. The micro-turbine engine of claim 6, wherein the micro-turbine engine is configured to produce a power output in a range of 1 kW to 20 kW.

8. The micro-turbine engine of claim 1, wherein the radial turbine stage comprises a rotor disk having a diameter in a range of 5 cm to 20 cm.

9. The micro-turbine engine of claim 1, wherein the at least one combustor stage comprises a flame holder made of perforated sheet metal.

10. The micro-turbine engine of claim 1, where the engine is manufactured from metal using conventional metal forming or machining processes.

11. The micro-turbine engine of claim 1 further comprising a mechanical connection to an electric motor adapted to start the engine and configured as an electric generator after self-sustaining operation of the engine is established to produce electrical power.

12. The micro-turbine engine of claim 1 in fluid communication with an additional power turbine that rotates independently of the radial turbine stage, further comprising a mechanical connection to a starter-generator combination electric motor to produce electrical power.

13. The micro-turbine engine of claim 1 further comprising fluid communication with a counter-flow heat exchanger, where compressed inlet air enters a cold side of the heat exchanger before entering the combustor, and turbine exhaust air enters a hot side of the heat exchanger before exiting the engine, such that the turbine exhaust air transfers heat to the compressed inlet air in the counter-flow heat exchanger to reduce an amount of fuel used to operate the engine.

14. The micro-turbine engine of claim 1 further comprising a mechanical connection to a starter-generator combination electric motor adapted to start the engine and to be used as an electric generator after self-sustaining operation of the engine to produce electrical power.

15. The micro-turbine engine of claim 1 further comprising fluid communication with a power turbine that rotates independently of the radial turbine stage, further comprising a mechanical connection to a starter-generator combination electric motor to produce electrical power.

* * * * *